US012786219B2

(12) United States Patent
Ayub et al.

(10) Patent No.: US 12,786,219 B2

(45) Date of Patent: Nov. 3, 2026

(54) SYSTEMS AND METHODS FOR ANOMALY DETECTION AND DEPLOYMENT FRAMEWORK FOR MAINFRAMES

(71) Applicant: JPMORGAN CHASE BANK, N.A., New York, NY (US)

(72) Inventors: Mohammed Ayub, Jersey City, NJ (US); Sean Moran, London (GB); Ronald D Lauttamus, Westerville, OH (US); John S Burden, Worthing (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/763,672

(22) Filed: Jul. 3, 2024

(65) Prior Publication Data

US 2026/0012470 A1 Jan. 8, 2026

(51) Int. Cl.
*H04L 9/40* (2022.01)
*G06F 40/205* (2020.01)

(52) U.S. Cl.
CPC ........ *H04L 63/1425* (2013.01); *G06F 40/205* (2020.01)

(58) Field of Classification Search
None
See application file for complete search history.

(56) References Cited

U.S. PATENT DOCUMENTS 11,372,705 B1 * 6/2022 Minarik .............. G06F 11/3447
2013/0282331 A1 * 10/2013 Cohen ..................... G06F 17/18 702/179
2016/0140151 A1 * 5/2016 Brew .................. H04L 63/1425 707/690
2016/0254944 A1 * 9/2016 Larsson ................ H04L 43/067 370/230
2019/0243747 A1 * 8/2019 Ross ................... G06F 11/3452
2019/0289471 A1 * 9/2019 Uelk ........................ H04L 41/22
2020/0073740 A1 * 3/2020 Ohana ................. G06F 11/0793
2020/0125448 A1 * 4/2020 von Trapp .......... G06F 11/0793
2020/0233774 A1 * 7/2020 Toledano ............ G06F 11/3447
2020/0374306 A1 * 11/2020 Dai ..................... H04L 63/1425
2020/0379867 A1 * 12/2020 Lemberg ................. G06F 17/18
2023/0038977 A1 * 2/2023 Ditto ................... G06F 11/3447
2023/0367665 A1 * 11/2023 Capano ............... G06F 11/3452
2024/0036963 A1 * 2/2024 Azeez ..................... G06N 20/00
2024/0104083 A1 * 3/2024 Dhingra .............. G06F 16/2365
2024/0187434 A1 * 6/2024 Shastri ..................... H04L 41/16
2024/0281723 A1 * 8/2024 Kaleem .................. G06N 20/20
2025/0036645 A1 * 1/2025 Bigdelu .............. G06F 16/2425

* cited by examiner

*Primary Examiner* — Joshua Joo

(74) *Attorney, Agent, or Firm* — GREENBERG TRAURIG LLP

(57) ABSTRACT

Disclosed are methods and techniques of detecting network anomalies and responding to the anomalies once detected. The methods, for example, include receiving, by a model executed by a processor, real-time log data of an operating network; parsing, by the model executed by the processor, the log data to identify one or more metrics; determining, by the model executed by the processor, a seasonality of the one or more metrics; determining whether the model should use an autoregressive model if seasonality is detected; and on determining that an autoregressive model should be used, training a model based on determining a grid search for a parameter based on an Akaike information criterion.

11 Claims, 4 Drawing Sheets

300

310

| Timestamp | Actual | Predicted | Error | Deviation | -4s | 4s | is_anomaly_detected | SMF_Label |
|---|---|---|---|---|---|---|---|---|
| 4/2/2023 0:00 | 8.736066 | 4.369700348 | 4.366365 | 0.971669782 | -3.87527 | 3.898093 | 1 | 1 |
| 4/4/2023 3:00 | 3.55 | 5.313295319 | -1.7633 | 0.601760006 | -2.36036 | 2.453719 | 1 | 0 |
| 4/8/2023 3:00 | 3.533333 | 4.719233986 | -1.1859 | 0.348908309 | -1.46044 | 1.314829 | 1 | 0 |
| 4/9/2023 5:00 | 3.576667 | 5.125646677 | -1.54898 | 0.396986196 | -1.65583 | 1.520057 | 1 | 0 |
| 4/13/2023 3:00 | 6.035 | 4.809563375 | 1.225437 | 0.295353613 | -1.15807 | 1.204761 | 1 | 0 |
| 4/13/2023 4:00 | 3.466667 | 5.439873574 | -1.97321 | 0.502088793 | -2.07251 | 1.944201 | 1 | 0 |
| 4/16/2023 3:00 | 4.023333 | 4.785691495 | -0.76236 | 0.202800732 | -0.83058 | 0.79183 | 1 | 0 |
| 4/19/2023 4:00 | 4.136667 | 5.233013193 | -1.09635 | 0.294543852 | -1.22708 | 1.129274 | 1 | 0 |

SYSTEMS AND METHODS FOR ANOMALY DETECTION AND DEPLOYMENT FRAMEWORK FOR MAINFRAMES

BACKGROUND

1. Field of The Invention

Aspects generally relate to systems and methods for anomaly detection and deployment framework for mainframes.

2. Description of the Related Art

Mainframe infrastructures have been in existence and are used extensively by the world's top businesses such as banks, insurers and retailers. They form the backbone of many mission-critical applications due to their processing power, reliability, security features and ability to handle large-scale applications. Modern mainframe infrastructures run billions of transactions per day pertaining to online banking, stock trading and electronic fund transfers in a virtualized environment. Therefore, stability and resiliency help maintain this infrastructure and ensure continuous and efficient operation of critical applications.

Mainframes generate a wide variety of telemetry and metrics, not limited to, CPU, memory, I/O, network and capacity planning, to monitor health, performance and security of the system. These metrics are captured by third party performance monitoring tools on a continual basis. There are various challenges Site Reliability Engineers (SRE's) face using these tools including data correlation (stitching metrics from different parts of mainframe ecosystem or with other IT infrastructure to provide holistic view of system performance), alert fatigue (manual finetuning of thresholds and prioritization on hundreds of application services for effective alerting), integration complexity (navigating different protocols, data formats and authentication mechanisms to collect and analyze data), and legacy/outdated tools and technologies (compatibility and integration of legacy components with modern tooling including advanced analytics), among others. Disclosed methods and techniques solve these issues by automating responses and providing platforms for anomaly detection.

Log-based anomaly detection has been an active field of research for some time, with recent advancements leveraging deep learning techniques to uncover anomalous log events related to unexpected system behavior. However, effectively detecting anomalies in practical scenarios still raises several significant challenges that have not yet been addressed. For example, past techniques are unable to adequately model anomalies in order to better identify and predict future anomalies.

Additionally, current systems include statistical, machine learning, and rule-based methods. However, statistical methods are flawed when faced with complex patterns and evolving threats. Machine learning methods are limited in their modeling capability and computational weight. Rule-based methods cannot adopt to complex patterns and evolving threats that do not fit within predefined patterns. Disclosed techniques and methods consistent with the present disclosure resolve the issues evident with each of these current methods.

SUMMARY

Disclosed are methods and techniques of detecting network anomalies and responding to the anomalies once detected. The methods, for example, include receiving, by a model executed by a processor, real-time log data of an operating network; parsing, by the model executed by the processor, the log data to identify one or more metrics; determining, by the model executed by the processor, a seasonality of the one or more metrics; determining whether the model should use an autoregressive model if seasonality is detected; and on determining that an autoregressive model should be used, training a model based on determining a grid search for a parameter based on an Akaike information criterion.

According to some embodiments, training of the model occurs using past data. According to some embodiments, the method may further comprise executing a determined response to the anomaly. According to some embodiments, the method may further comprise determining a time-based prediction for a next anomaly based on the classification. According to some embodiments, the method may further comprise generating a visualization of the real-time log data to a user interface executed by a user device. According to some embodiments, the method may further comprise accumulating a set of classifications and searching for a pattern in the set of classifications. According to some embodiments, the seasonality detection can comprise an Augmented Dickey Fuller test, a Philips Perron test, or a Kwiatkowski-Phillips-Schmidt-Shin test.

DETAILED DESCRIPTION

Figure 1:
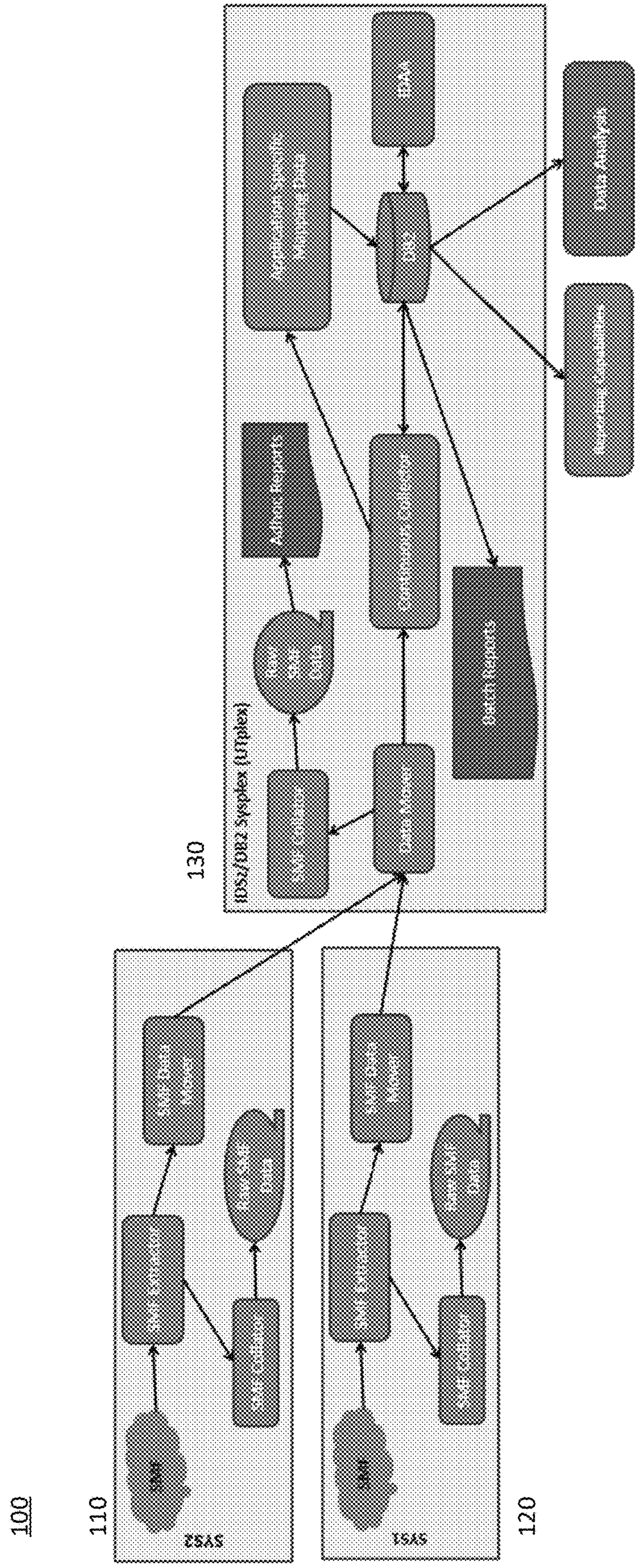
FIG. 1 is a logical flow of an anomaly detection platform, in accordance with aspects.

This disclosure generally relates to systems and methods for a generative model including recovery strategy creation, evaluation, and recommendation.

Disclosed are methods and techniques of anomaly detection and diagnostic tool utilizing capacity and performance metrics pertaining to hundreds of mission critical applications (e.g., report classes). Disclosed methods and techniques can proactively be used to anomalous/unusual behavior in this environment which can be an activity due to capacity and performance contention for various reasons like environment failures, overload of requests etc. Disclosed methods and techniques capture the normal daily profiles of critical metrics, and any considerable deviation, measured against a threshold relevant to particular metrics, away from the normal is flagged as an anomaly and responded to. Disclosed methods and techniques respond to differences in actual values and generated forecasts. Disclosed methods and techniques include categorizing the detections based on a group of application types and responsible components in the mainframe architecture.

Therefore, by collating detections across metrics pertaining to different applications and components of the mainframe, disclosed methods and techniques will be able to increase the overall operational efficiency by triaging and troubleshooting issues faster to reduce system disruption, financial losses, disrupted services and damage to reputation.

Disclosed methods and techniques provide further benefits including: complex time series modeling of different types of capacity and performance metrics, including those from legacy applications and producing useful data for anomaly detection and prediction; proactively detecting anomalies to take preventative measures rather than the current manually-intensive, reactive approaches; optimized control to change thresholds for creating alerts and thus reducing alert fatigue and non-meaningful or mistaken alerts; efficient real-time diagnoses of anomalies across mainframe applications and components; relatively quick, efficient, and scalable because it reduces or eliminates production of labels from domain experts; and significant compression of log messages which aids in troubleshooting issues in a complex environment by reducing reporting, storage, and computing loads (e.g., achieving lower computational costs in terms of runtime and/or memory). These benefits have been proven by disclosed test results.

Disclosed techniques and methods overcome the need for annotated examples of historic anomalies and lack of annotated data generally, the vast amount of log data required by modern systems and scaling, and inefficient handling of the vast amount of data used and explaining (e.g., providing context for) that data.

The network implementing the model can be a financial system. The network can comprise large-scale log datasets stored in a distributed manner, on a cloud system, or at a central repository connected to a network.

A configurable confidence level may be implemented.

Disclosed methods and techniques include a model able to capture a subset of anomalous metrics in each report class. The model may include a score (e.g., an aggregate anomaly impact score) from each report class that conveys to what degree an anomaly affects a particular report class.

System log metrics can be generated by software applications, operating systems, and network devices. System logs can provide a record of system activities and form a critical source of information for an enterprise facilitating a host of data mining activities, from the detection of anomalous events, security and vulnerability diagnoses, and understanding system errors and crashes. Log-based anomaly detection plays a crucial role in ensuring the integrity and security of computer systems, and the information technology systems that monitor those systems, by identifying abnormal patterns in log data. Anomalies in log data can manifest as deviations from normal behavior, indicating potential security threats, system malfunctions, or fraudulent activities. As organizations increasingly rely on complex computing environments, there is a constant need to evolve anomaly detection technology to meet the growing challenges inherent in effectively detecting anomalies over large-scale datasets for mission critical industrial applications.

System log metrics can arise from diverse sources, such as applications, embedded systems, virtualized hardware, and network devices Current standard formats are available, but are also often changed to be customized by vendors, product owners, or owners. For example, additional information can be added. Additionally, logs can be tailored to specific requirements.

Embodiments consistent with the present disclosure include recognizing and categorization of incoming log events. Embodiments consistent with the present disclosure include preprocessing and encoding log data. A plurality of rules may be implemented to parse the incoming log events. The plurality of rules can include depth size, masking, and thresholds. Statistical information can be determined after each iteration of parsing the logs. The logs may be parsed periodically to maintain a real-time view of the subject system.

A recurring timestamp can be used to generate the data logs. The same timestamp can be used during non-anomaly time periods and can be represented by a typical frequency. That frequency can increase when disruptions occur, and an increased number of errors can be generated as a result.

FIG. 1 is a block diagram of a system capable of implementing disclosed methods and techniques. System 100 can include systems 110, 120 and sysplex (UTplex) 130. Systems 110 and 120 includes x. System 130 includes y.

System 100 can accomplish complex reporting, including performance, capacity, billing, LOB, and exceptions. Also, system 100 can perform data analysis including data studio, SPUFI, and ad-hoc analysis. Further, system 100 can perform data retention through raw SMF data for audit requirements and esoteric analysis.

System 100 can be capable of changing the model to iteratively predict an anomaly based on a past window size (e.g., 2 weeks). A new window size can thus be used.

Mainframes typically consists of a high-performance databases used to support a great degree of security and availability. A good example of such database is DB2 (database 2) that supports additions data integration and reporting functionalities apart from the traditional database features.

SMF (System Management Facilities) can be a method for writing out records of activity of an operation system. The activity can relate to input/outputs, network activity, software usage, error conditions, and/or processor utilization. Types of SMFs can be batch/STC (started task), RMF (resource management facility) CPU (control processing unit), RMF Paging, RMF WLM (workload manager), RMF CF (coupling facility) & DASD (direct access storage device), RMF Common Storage, DB2 (database 2), MQ (queue manager), Master Broker, TCPIP (Transmission Control Protocol/Internet Protocol), Websphere, CICS (Customer Information Control System), DSN (Defense Switched Network) Activity, Hardware, GuardRails data, IMS Log Data, and/or Decollect data.

110 and 120 are end-point systems which can have business critical applications running, consistent with disclosed embodiments. 110 and 120 end-point systems can have a SMF client installed to transfer the data to a centralized database system.

130 is a typical system which contains a centralized database system which can collect data from all end-point applications through the SMF collator and inject data from the applications into the DB2 database. Various types of reporting such as Batch, Real-time and data analysis functions could then be setup on the database.

In some embodiments, a score (as an aggregate anomaly impact score) can be determined from each report class that conveys to what degree such (or any other) anomaly affects a particular report class. Report classes can be used to report on a transaction or a subset of transactions running in a single service class. Report classes can also be used to combine transactions running in different service classes.

Figure 2:
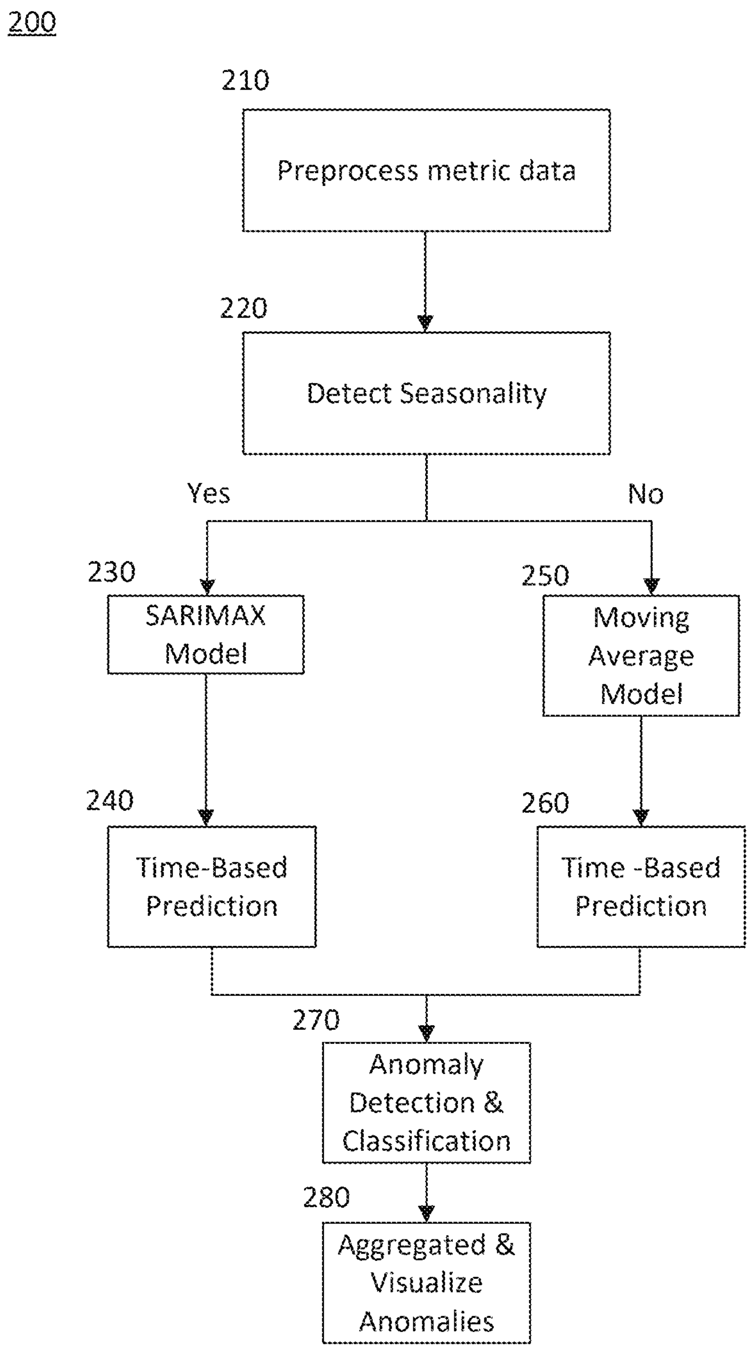
FIG. 2 is a process diagram of an anomaly detection platform, in accordance with aspects.

FIG. 2 is a block diagram of a method consistent with disclosed embodiments and techniques.

In step 210, metric data may be ingested into the model and preprocessed. Preprocessing can include identifying the metrics data for "holes" (null values) by forward filling, resampling and taking mean for a timestamp. The timestamp may be 1 hour because it reduces significant local fluctuations and accounts for large variations that are likely to correlate to anomalies.

In step 220, a seasonality (e.g., a time period to analyze) may be detected based on a report of an anomaly. Seasonality can be determined through statistical checks including Augmented Dickey Fuller test or (ADF Test), Philips Perron test (PP Test), or Kwiatkowski-Phillips-Schmidt-Shin—KPSS test (trend stationary). Additionally, the statistical check can be visually through Autocorrelation (ACF) and Partial Autocorrelation (PACF) Functions.

The model can determine whether or not an advanced model may be used. If seasonality is detected, an advanced model may be used, and if seasonality is not detected, a moving average may be used.

In step 230, an advanced model is used. The advanced model can be a seasonal autoregressive integrated moving average exogenous model (SARIMAX). SARIMAX can use hyperparameters. Ensemble modeling techniques can be implemented for time series prediction tasks. On a trained model, a grid search can be used for hyperparameters based on Akaike Information Criterion. The hyperparameters can include:

P—seasonal AutoRegressive (AR) lag order
Q—seasonal Moving Average (MA) lag order
p—non-seasonal AutoRegressive (AR) lag order
q—non-seasonal Moving Average (MA) lag order
d—the order of non-seasonal differences needed for stationarity
D—the order of seasonal differences needed for stationarity
s—length of the season A model can be trained on past information, including past reports of anomalies during certain timeframes, in this way. When past reports are used, they are used unlabeled. A pattern can be learned from past reports and any deviations experienced during the timeframes covered in the past reports. The trained model can then be used for current data points to forecast future data points.

In step 250, a moving average model is used.

In steps 240, 260, a time-based prediction is output from the modeling.

In step 270, an anomaly is detected and classified based on the report and the model. The detection and classification can include predicting if the value is 'X' deviations from mean value of the metric. If predicted value is greater than threshold, the model can classify an event as an anomaly. Dynamic thresholding is done to vary the deviations, 'X,' based on daily usage.

In step 280, the anomaly can be aggregated and visualized through a user interface. Step 280 can include accumulating results from different mainframe metrics and analyze collectively. Logical mainframe application hierarchy can be used to group metrics and find patterns/causes for recurrent anomalies. The patterns can include timing (e.g., when one or more applications occur or when certain applications operate simultaneously, a time of day, frequency), severity (e.g., amount of disruption or amount of deviation), and/or for which systems (e.g., whether the systems are connected, software applications on those systems).

In some embodiments, a classification of an anomaly can be used to generate a response to the anomaly or the cause of the anomaly. The response can include backing up and/or restarting certain programs, applications, or a processor. The response can be used to generate an action item checklist to address a core issue related to the anomaly.

Figures 3A, 3B:
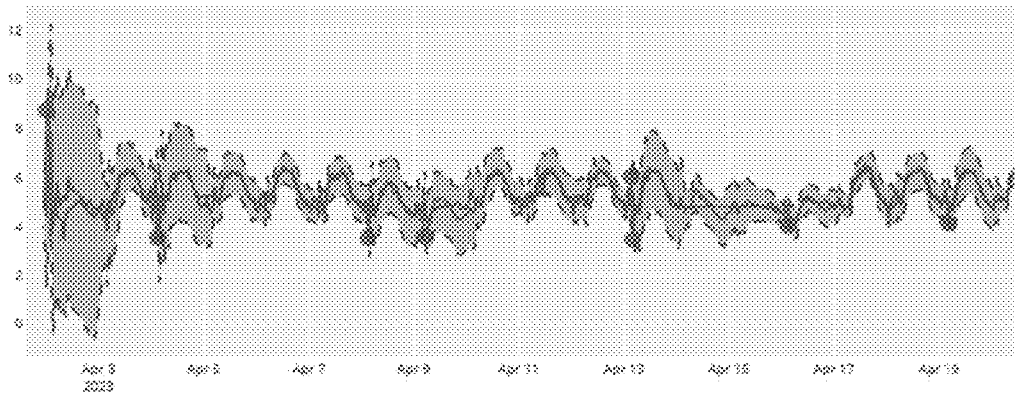
FIG. 3A is an illustration of results of the anomaly detection platform, in accordance with aspects.
FIG. 3B is an illustration of results of the anomaly detection platform, in accordance with aspects.

FIGS. 3A and 3B are test results of a method consistent with disclosed embodiments and techniques.

FIG. 3A shows exemplary test data for CPU usage over a time period. A threshold (in dashed line) is mapped. The threshold used for this example is 4 sigma.

FIG. 3B shows labeled SME feedback on model results. The model results can include labeled data including a timestamp, an actual error, a predicted error, a difference between the actual and predicted (labeled as "error"), a deviation, a negative and positive four sigma calculation, whether an anomaly is detected, and a SME label.

Figure 4:
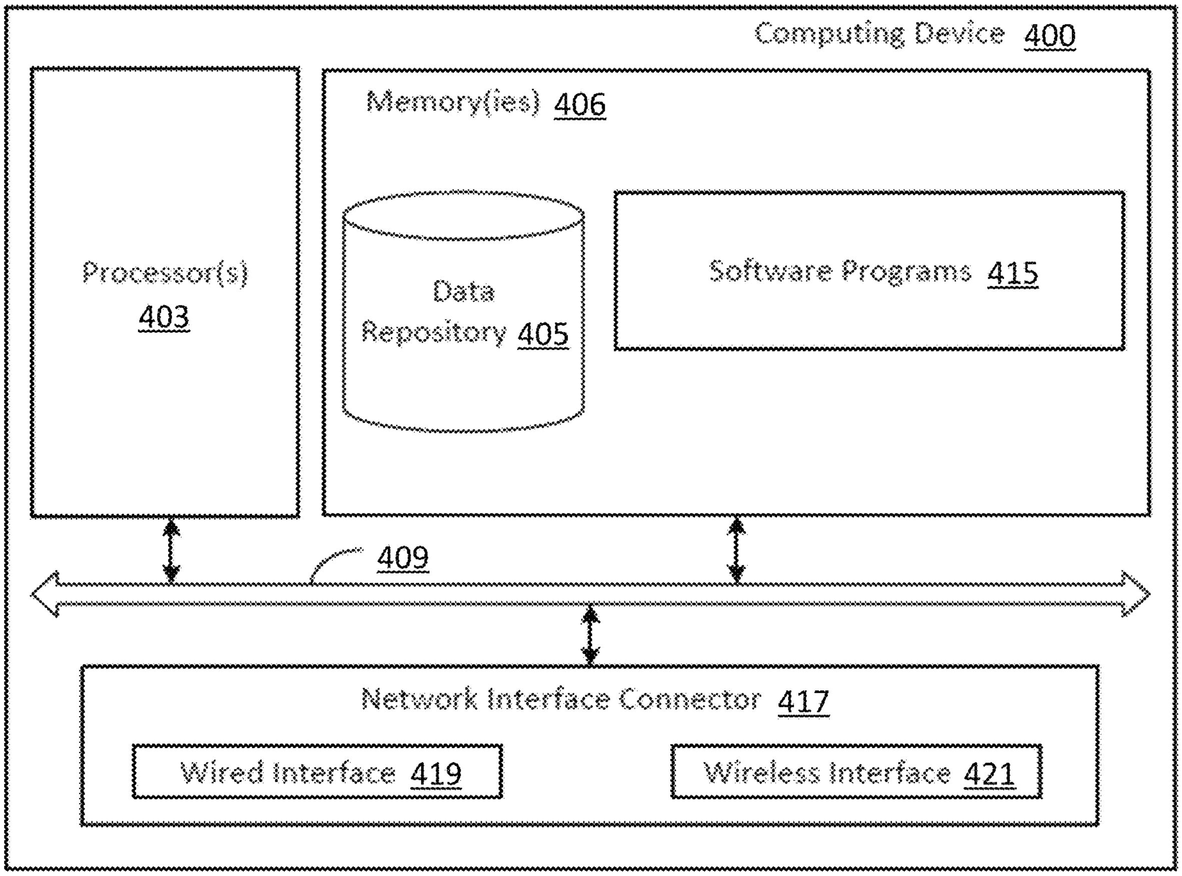
FIG. 4 is a block diagram of a computing device for implementing certain aspects of the present disclosure.

FIG. 4 is a block diagram of a computing device for implementing certain aspects of the present disclosure. FIG. 4 depicts exemplary computing device 400. Computing device 400 may represent hardware that executes the logic that drives the various system components described herein. For example, system components such as a various software engines, a ML model engine, an interface, various database engines and database servers, and other computer applications and logic may include, and/or execute on, components and configurations like, or similar to, computing device 400.

Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps, logical steps, and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing machine" a "computing device," an "electronic device," a "mobile device," etc. These may be a computer, a computer server, a host machine, etc. As used herein, the term "processing machine," "computing device, "electronic device," or the like is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular step, steps, task, or tasks, such as those steps/tasks described above. Such a set of instructions for performing a particular task may be characterized herein as an application, computer application, program, software program, or simply software. In one aspect, the processing machine may be or include a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

The processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:

1. A method of detecting network anomalies comprising:

receiving, by a model executed by a processor, real-time log data of an operating network;

parsing, by the model executed by the processor, the log data to identify one or more metrics;

determining, by the model executed by the processor, a seasonality of the one or more metrics;

determining whether the model should use an autoregressive model if seasonality is detected;

on determining that the autoregressive model should be used, training the autoregressive model to form a trained model, the training being based on determining a grid search for a parameter based on an Akaike information criterion;

applying the trained model on the received real-time log data;

comparing a deviation of a predicted value of the identified one or more metrics based on application of the trained model on the received real-time log data to a mean value of the identified one or more metrics, and upon determining that the predicted value is greater, classifying the real-time log data during the seasonality as an anomaly of the network anomalies into a set of classifications;

searching for a pattern in the set of classifications, the pattern comprising operating one or more applications; and determining a time-based prediction for a next anomaly based on the set of classifications; and automatically executing, by the processor, a determined response to the anomaly including restarting the one or more applications.

2. The method of claim 1, wherein the training of the autoregressive model occurs using past data.

3. The method of claim 1, further comprising generating a visualization of the real-time log data to a user interface executed by a user device.

4. The method of claim 1, wherein the seasonality detection comprises an Augmented Dickey Fuller test, or a Philips Perron test.

5. A computer processing system comprising:

a memory configured to store instructions; and a hardware processor operatively coupled to the memory for executing the instructions to:

receive, by a model executed by a processor, real-time log data of an operating network;

parse, by the model executed by the processor, the log data to identify one or more metrics;

determine, by the model executed by the processor, a seasonality of the one or more metrics;

determine whether the model should use a moving average model or an autoregressive model;

on determining that the autoregressive model should be used, training the autoregressive model to form a trained model, the training being based on determining a grid search for a parameter based on an Akaike information criterion;

apply the trained model on the received real-time log data;

compare a deviation of a predicted value of the identified one or more metrics based on application of the trained model on the received real-time log data to a mean value of the identified one or more metrics, and upon determining that the predicted value is greater, classifying the real-time log data during the seasonality as an anomaly of the network anomalies into a set of classifications;

searching for a pattern in the set of classifications, the pattern comprising operating one or more applications;

determining a time-based prediction for a next anomaly based on the set of classifications; and automatically executing, by the processor, a determined response to the anomaly including restarting the one or more applications.

6. The system of claim 5, wherein the training of the autoregressive model occurs using past data.

7. The system of claim 5, further comprising generating a visualization of the real-time log data to a user interface executed by a user device.

8. The system of claim 5, wherein the seasonality detection comprises an Augmented Dickey Fuller test, a Philips Perron test, or a Philips Perron test.

9. A non-transitory computer readable storage medium, including instructions stored thereon, which when read and executed by one or more computers cause the one or more computers to perform steps comprising:

receiving, by a model executed by a processor, real-time log data of an operating network;

parsing, by the model executed by the processor, the log data to identify one or more metrics;

determining, by the model executed by the processor, a seasonality of the one or more metrics;

determining whether the model should use a moving average model or an autoregressive model;

on determining that the autoregressive model should be used, training the autoregressive model to form a trained model, the training being based on determining a grid search for a parameter based on an Akaike information criterion;

applying the trained model on the received real-time log data;

comparing a deviation of a predicted value of the identified one or more metrics based on application of the trained model on the received real-time log data to a mean value of the identified one or more metrics, and upon determining that the predicted value is greater, classifying the real-time log data during the seasonality as an anomaly into a set of classifications;

searching for a pattern in the set of classifications, the pattern comprising operating one or more applications;

determining a time-based prediction for a next anomaly based on the set of classifications; and automatically executing, by the processor, a determined response to the anomaly including restarting the one or more applications.

10. The steps of claim 9, wherein the training of the autoregressive model occurs using past data.

11. The steps of claim 9, further comprising generating a visualization of the real-time log data to a user interface executed by a user device.

* * * * *